(12) United States Patent
Kowalczyk et al.

(10) Patent No.: US 9,475,423 B2
(45) Date of Patent: Oct. 25, 2016

(54) DRIVABLE COMPRESSION CLIP

(71) Applicant: Ford Global Technologies, LLC, Dearborn, MI (US)

(72) Inventors: John Urban Kowalczyk, Livonia, MI (US); Albert Ekladyous, Shelby Township, MI (US); Gary Edward Henige, Northville, MI (US); Sleiman N. Abdelnour, Macomb, MI (US); Kelley Maria Adams-Campos, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 14/263,115

(22) Filed: Apr. 28, 2014

(65) Prior Publication Data

US 2015/0307019 A1  Oct. 29, 2015

(51) Int. Cl.
 *B60Q 1/26* (2006.01)
(52) U.S. Cl.
 CPC ........... *B60Q 1/2615* (2013.01); *B60Q 1/2649* (2013.01); *B60Q 1/2653* (2013.01)
(58) Field of Classification Search
 CPC ............. F21S 48/1109; F21S 48/1104; F21S 48/212; F21S 48/211; F21S 48/2206; B60Q 1/0475; B60Q 1/0683; B60Q 1/263; B60Q 1/2692; B60Q 2900/20; B60Q 1/24; B60Q 1/0408; B60Q 1/0483; B60Q 3/025; B60Q 1/0466; B60Q 1/2649; B60Q 1/2615; B60Q 1/2653; B60R 1/06; B60R 2011/004; B60R 2021/343; H01R 13/741; F16B 37/041; Y10T 24/44026
See application file for complete search history.

(56) References Cited

U.S. PATENT DOCUMENTS

| 5,101,540 | A | 4/1992 | Roof et al. | |
| 5,243,502 | A | 9/1993 | Cappucitti et al. | |
| 2002/0145881 | A1* | 10/2002 | Yamada | B60Q 1/0491 362/507 |
| 2004/0109313 | A1* | 6/2004 | Smith | B60Q 1/2611 362/240 |
| 2010/0053986 | A1* | 3/2010 | Ishikawa | B60R 1/1207 362/509 |
| 2012/0081914 | A1* | 4/2012 | Ono | B60Q 1/0088 362/473 |

FOREIGN PATENT DOCUMENTS

JP  2010012867  1/2010

* cited by examiner

*Primary Examiner* — Karabi Guharay
*Assistant Examiner* — Fatima Farokhrooz
(74) *Attorney, Agent, or Firm* — Jason Rogers; Bejin Bieneman PLC

(57) ABSTRACT

A lamp assembly is provided for installation in an opening of a vehicle body. The lamp assembly includes a lamp container having first and second sides, each of the first and second sides integrally including first and second stops, and at least one clip assembly including a clip, a threaded bolt, and a nut. The clip has a connecting wall with respective first and second side walls extending from the connecting wall, and first and second tabs extending inwardly respectively from the first and second side walls, the threaded bolt being inserted through an opening in the connecting wall of the clip, and the nut being threaded onto the bolt. When the lamp assembly is in a pre-compressed position, the nut is spaced away from the stops, and, when the lamp assembly is in a compressed position, at least one of the nut and the connecting wall contacts the stops.

12 Claims, 5 Drawing Sheets

DRIVABLE COMPRESSION CLIP

BACKGROUND

A lamp assembly or the like for a vehicle may require an adhesive seal to the vehicle body. Accordingly, the adhesive may be provided with a protective backing or the like that can be removed when the lamp assembly is properly positioned for installation in the vehicle body. However, depending on a state of the lamp assembly, it may be difficult to remove the protective backing. For example, when a mechanism, such as a clip, is required to compress the adhesive seal and bond the lamp assembly to the vehicle body during installation this mechanism may interfere with removing the protective backing. On the other hand if an adhesive seal is not provided for the lamp assembly, a hermetic bond to the vehicle body may not be obtained.

DRAWINGS

DETAILED DESCRIPTION

Figure 1:
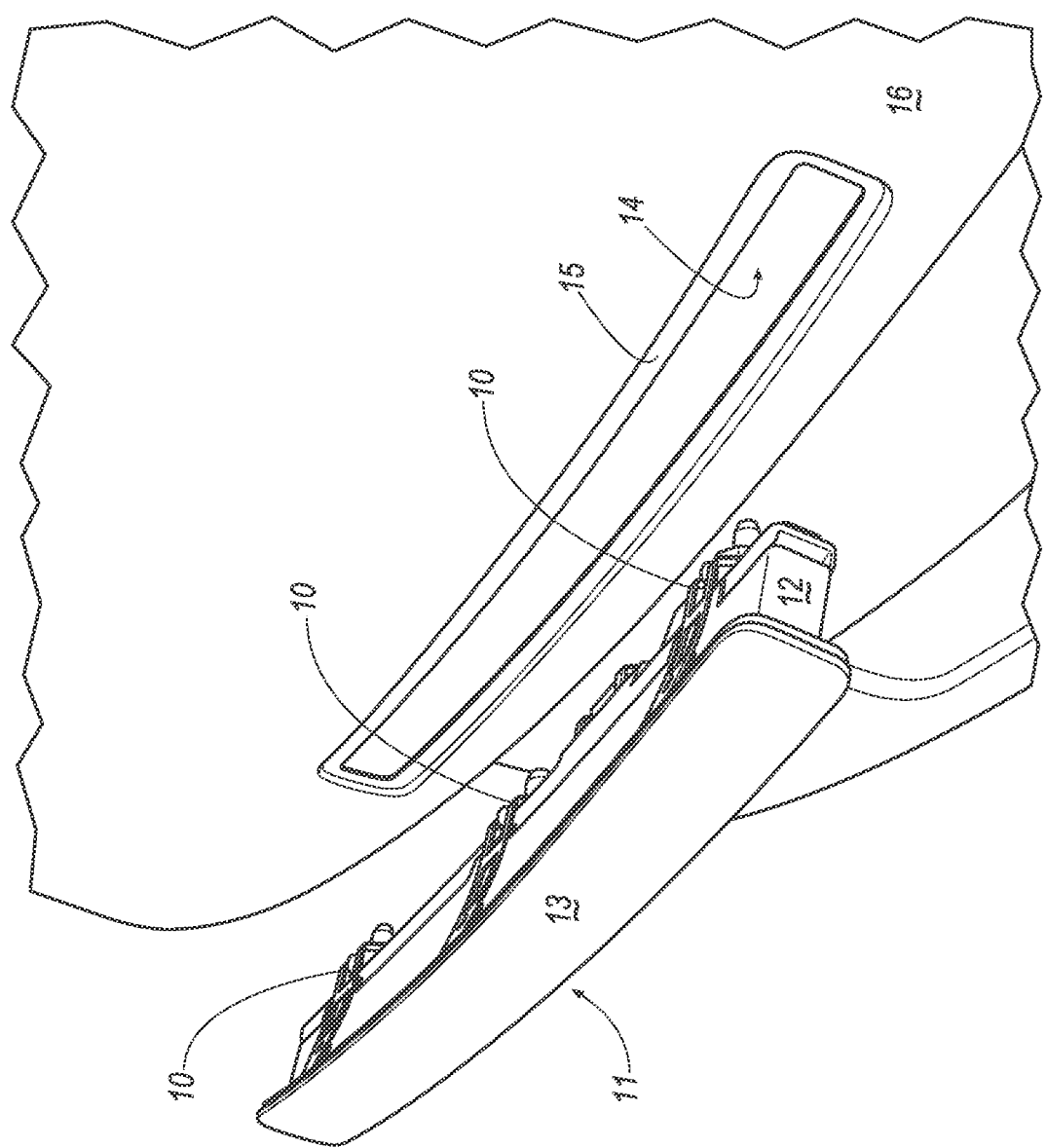
FIG. 1 is a perspective exploded view of a lamp assembly prior to installation in a vehicle body.
Figure 2:
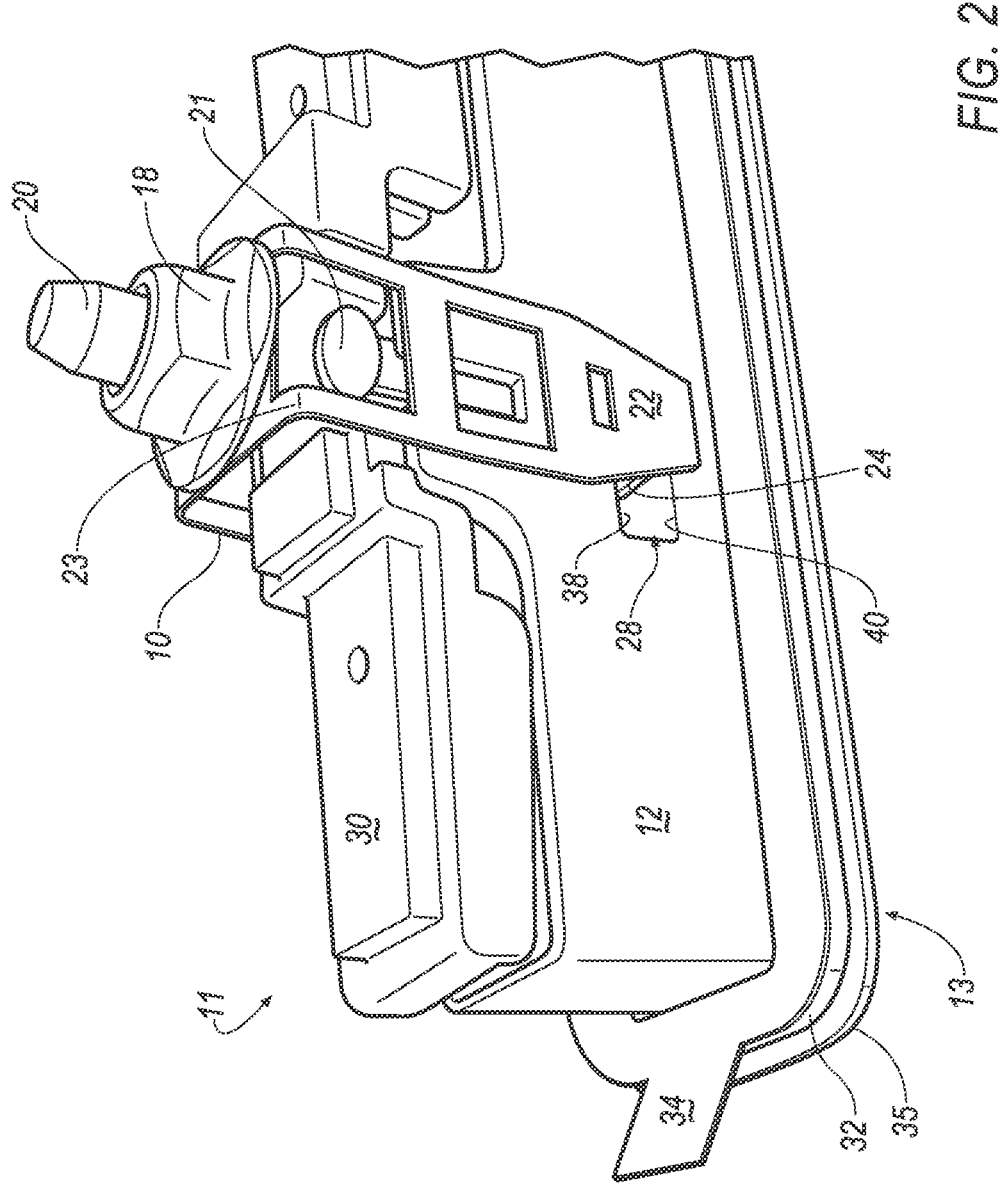
FIG. 2 is a perspective view of a portion of a lamp assembly in a pre-compressed position.
Figure 3:
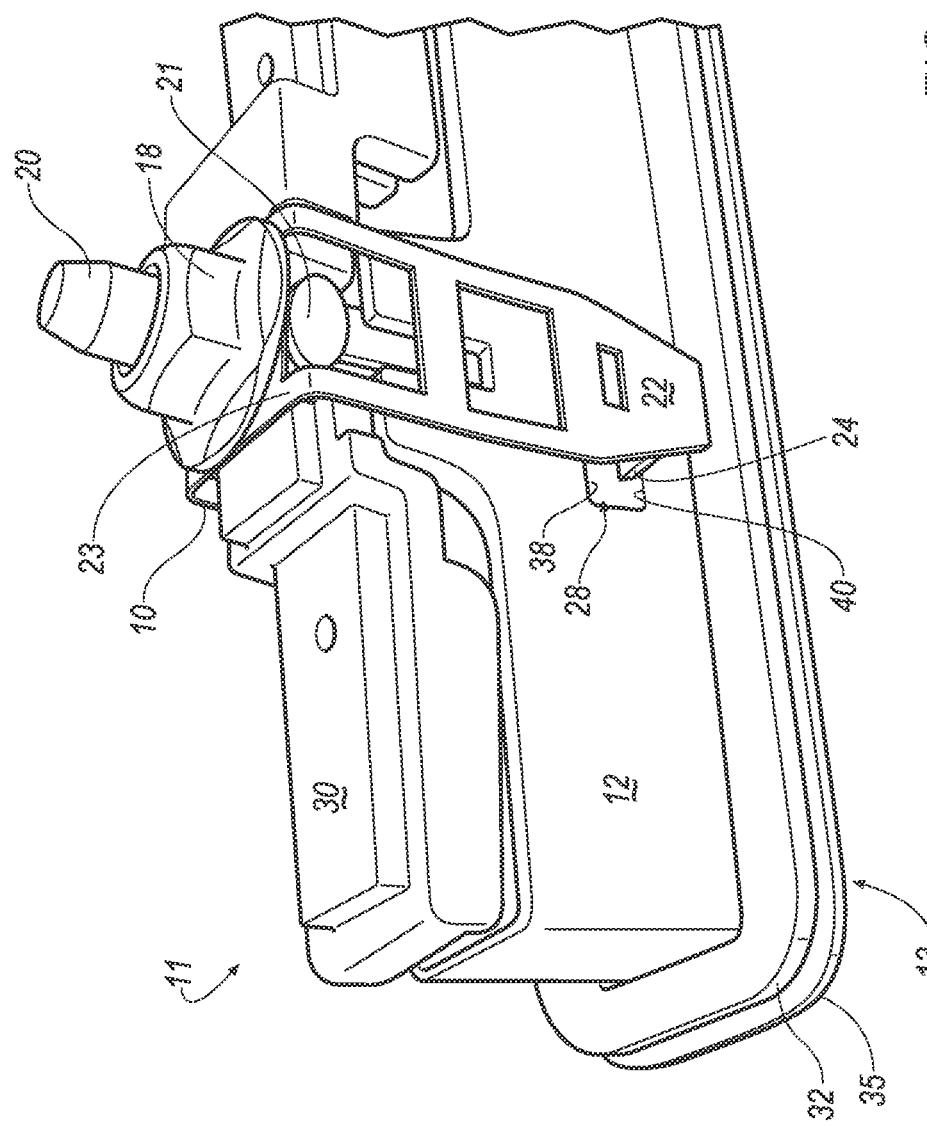
FIG. 3 is a perspective view of a portion of a lamp assembly in a compressed position.
Figure 4:
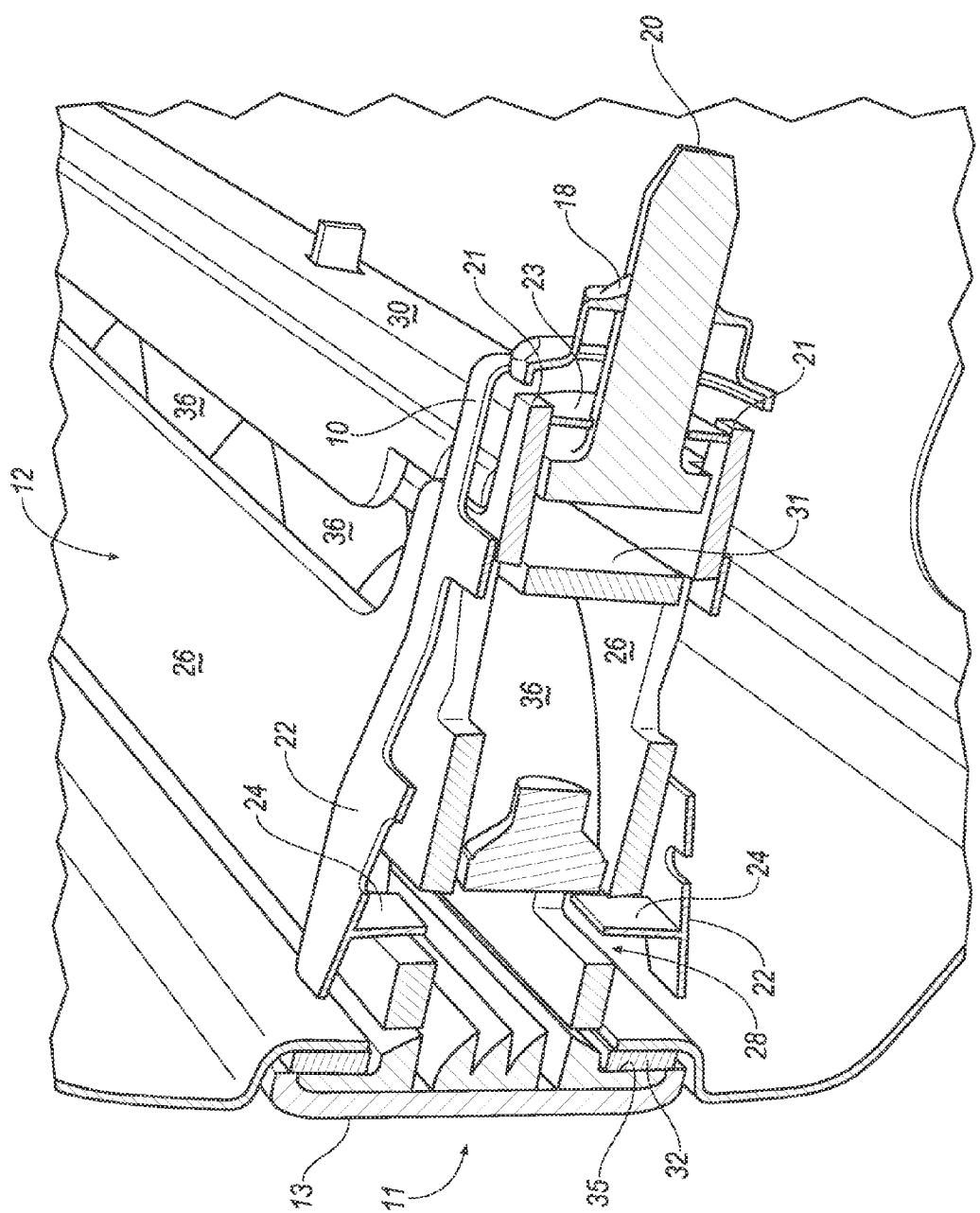
FIG. 4 is a perspective cutaway view of a portion of a lamp assembly in a pre-compressed position.
Figure 5:
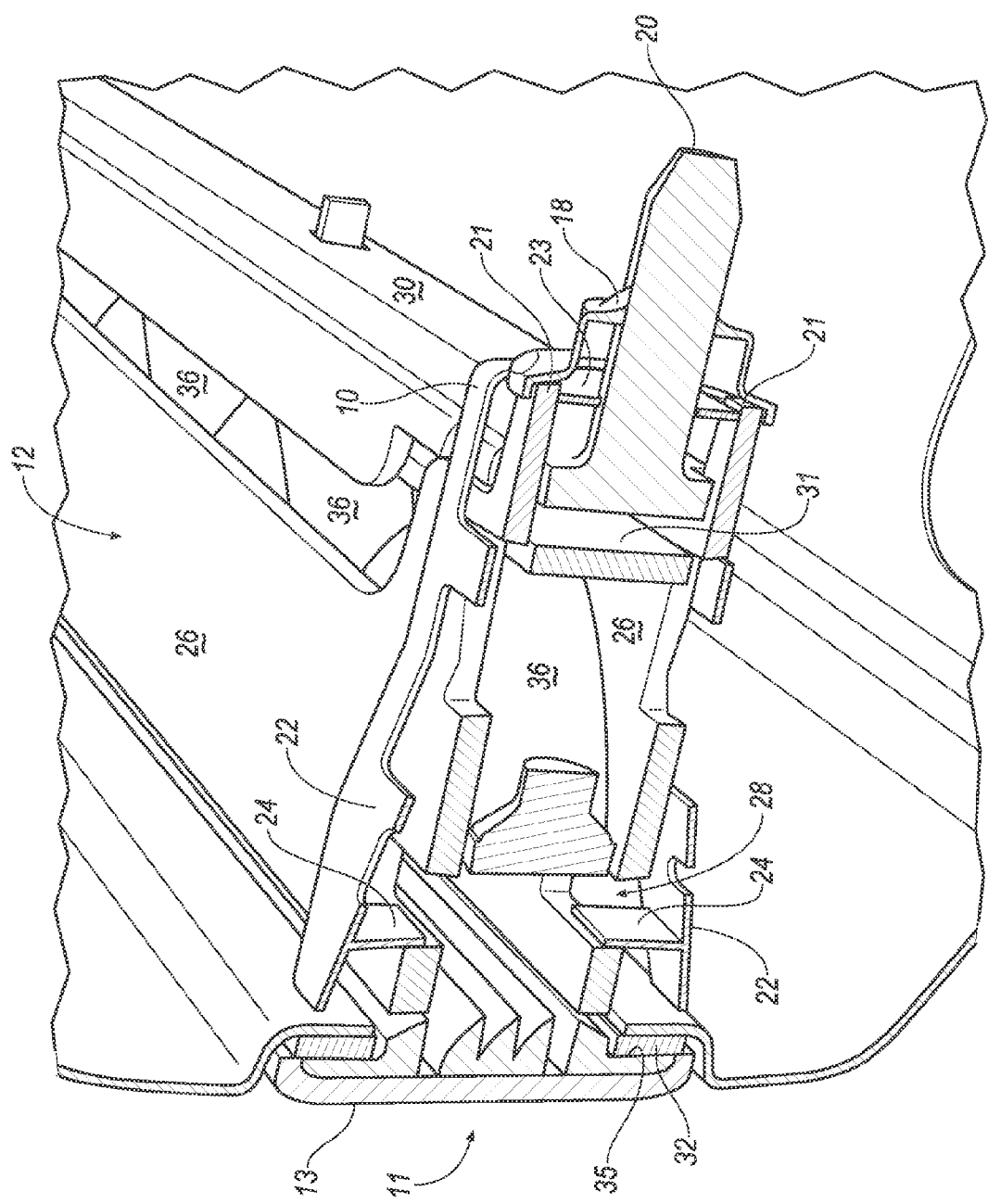
FIG. 5 is a perspective cutaway view of a portion of a lamp assembly in a compressed position.

With reference to FIGS. 1-5, one or more compression clips 10 may be provided as part of a lamp assembly 11 for installation in an opening 14 of a vehicle body 16. The lamp assembly 11 may be provided to accommodate one or more lamps 36 disposed in a lamp container 12 that generally includes, e.g., integrally formed therewith, a lens 13 as well as first and second sides 26, each of the first and second sides 26 integrally including first and second stops 21. The clip 10 is included in a clip assembly that also includes a bolt 20 and a thread-cutting nut 18. Alternatively, the bolt 20 and the nut 18 could each be threaded. The clip 10 generally forms a U-shape around the lamp container 12, the clip 10 having a connecting wall 23 with respective first and second arms, also referred to as side walls, 22 extending from the connecting wall 23, e.g., at roughly a right angle. First and second tabs 24 respectively extend inwardly, e.g., at a generally right or acute angle, from the first and second side walls 22, the bolt 20 being inserted through an opening in the connecting wall 23 of the clip 10, and the nut 18 being threaded onto the bolt 20, e.g., the bolt 20 may be provided as a smooth plastic post with the nut 18 cutting a thread into the bolt 20.

The compression clip 10 accordingly provides a mechanism for compressing the lamp assembly 11 for installation in the vehicle body 16, e.g., such installation including pressing a flange 35 formed about a perimeter of the lens 13 against a flange 15 formed about a perimeter of the vehicle body 16 opening 14. When the lamp assembly 11 is in a pre-compressed position (FIGS. 2 and 4), the nut 18 is spaced away from the stops 21, and, when the lamp assembly 11 is in a compressed position (FIGS. 3, 5), the nut 18 and/or a side of the connecting wall 23 contacts the stops 21. That is, the stops 21 are configured to stop progress of tightening the nut 18 on the bolt 20.

Advantageously, the compression clip 10 provides for an efficient and effective installation of the lamp assembly 11 in the vehicle body 16, particularly with respect to an adhesive 32 that may be provided to bond or seal the lamp assembly 11 to the vehicle body 16. For example, the lamp assembly 10 may be inserted into the opening 14, and positioned so that the flanges 15 and 35 may be pressed together. The flange 35 included in the lens 13 of the lamp assembly 11 may have affixed thereto layer of an adhesive 32, e.g., double-sided foam tape or the like, the adhesive 32 being provided with a protective backing 34. When the lamp assembly 11 is positioned in the opening 14 as just described, the protective backing 34 may be removed and discarded. The nut 18 may then be tightened about the bolt 20 until the nut 18 comes into contact with the stops 21, i.e., tightening the nut 18 drives the clip 10 toward the lens 13, thereby compressing the lamp assembly 10 including the securing member 30 and the lamp container 12. The tabs 24, which may be disposed in slots 28 of the container 12 sides 26, may be moved from a position touching or near respective first walls 38 of slots 28 to a position in contact with respective second walls 40 of the slots 28, the second walls 40 being closer to the lens 13 than the first walls 38. In general, the lamp assembly 11 may be configured, e.g., the stops 21 located, such that a desired compression load, e.g., 40%, on the lamp assembly 11 is achieved.

The clip 10 is generally formed of a metal, e.g., aluminum, as is the nut 20, although other materials are possible. Further, the bolt 20 that may also be included in a clip assembly is generally formed of a molded plastic.

The bolt 20 may be integrally formed with, e.g., molded as part of, the securing member 30. For example, the securing member 30 may have a length substantially the same as a length of the lamp container 12, and may act as a cover, e.g., a front cover where the lamp assembly 11 is installed at the rear of a vehicle body 16. In this case the securing member 30 is substantially parallel to the lens 13. That is, it will be understood that the member 30 and the lens 13 may not be perfectly planar, and or an installation of the lamp assembly 11 may result in the member 30 and lens 13 not being precisely parallel. In any case, the bolt 20 may extend generally perpendicularly from a surface of the member 30 that is generally parallel to the lens 13.

Likewise, the stops 21 may be integrally formed with, e.g., molded as part of, the walls 26 of the lamp container 12. As noted above, when the nut 18 is tightened about the bolt 20, the nut 18 is moved toward the stops 21. For example, if the lens 13 is at a rear of the vehicle body 16, the nut 18 is moved toward the vehicle body 16 rear when tightened, thereby compressing lamp assembly 11, e.g., driving the securing member rearward toward the lamp container 12 and the lens 13, and driving the clip 10 toward the flange 15. The nut 18 contacts the stops 21, thereby stopping this compression process, the stops 21 having been configured to achieve a predetermined compression load of the lamp assembly 11.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A lamp assembly for installation in an opening of a vehicle body, comprising:
   a lamp container having first and second sides, each of the first and second sides integrally including first and second stops;
   at least one clip assembly including a clip, a bolt, and a nut, the clip having a connecting wall with respective first and second side walls extending from the connecting wall, and first and second tabs extending inwardly respectively from the first and second side walls, the bolt being inserted through an opening in the connecting wall of the clip, and the nut being threaded onto the bolt;
   wherein, when the lamp assembly is in a pre-compressed position, the nut is spaced away from the stops, and, when the lamp assembly is in a compressed position, at least one of the nut and the connecting wall contacts the stops.

2. The lamp assembly of claim 1, wherein the at least one clip assembly is a plurality of clip assemblies.

3. The lamp assembly of claim 1, further comprising at least one lamp disposed within the lamp container.

4. The lamp assembly of claim 1, wherein the first and second tabs extend through respective first and second slots in the respective first and second sides of the lamp container.

5. The lamp assembly of claim 1, wherein, when the lamp assembly is in the compressed position, a flange of the lamp assembly is pressed against a flange on the opening of the vehicle body.

6. The lamp assembly of claim 1, further comprising a securing member disposed within the at least one clip assembly and generally parallel to a lens face of the lamp assembly.

7. The lamp assembly of claim 1, wherein the nut is integrally formed as part of the securing member.

8. The lamp assembly of claim 1, wherein the stops are configured to achieve a predetermined compression load of the lamp assembly when the nut contacts the stops.

9. The lamp assembly of claim 3 wherein the at least one lamp is a plurality of lamps.

10. The lamp assembly of claim 4, wherein each of the slots has a first wall and a second wall, the first wall being further from the vehicle body than the second wall when the lamp assembly is inserted in the opening of the vehicle body, and further wherein, when the lamp assembly is in the compressed position, the tabs contact the second wall.

11. The lamp assembly of claim 5, further comprising a double-sided adhesive affixed to the flange of the lamp assembly, whereby the flange of the lamp assembly is affixed to the flange of the opening of the vehicle body when the lamp assembly is in the compressed position.

12. The lamp assembly of claim 11, wherein one side of the double-sided adhesive is provided with a protective backing that is configured to be removed when the lamp assembly is in the pre-compression position.

* * * * *